TOOL FOR FORMING AND CRIMPING AXIAL LEAD COMPONENTS

Filed Nov. 9, 1961 2 Sheets-Sheet 1

INVENTOR.
DERRELL A. DRAKE
BY Whittemore Hulbert & Belknap
ATTORNEYS

Aug. 6, 1963 D. A. DRAKE 3,099,838

TOOL FOR FORMING AND CRIMPING AXIAL LEAD COMPONENTS

Filed Nov. 9, 1961 2 Sheets-Sheet 2

INVENTOR.
DERRELL A. DRAKE
BY Whittemore, Hulbert & Belknap
ATTORNEYS 3,099,838
TOOL FOR FORMING AND CRIMPING AXIAL LEAD COMPONENTS
Derrell A. Drake, 22527 Socia, St. Clair Shores, Mich.
Filed Nov. 9, 1961, Ser. No. 151,388
11 Claims. (Cl. 1—322)

The present invention relates to improvements in a portable hand tool for the special forming of the wiring leads of an electrical component of the axial lead type, such as a resistor, a capacitor, a diode and the like; and to insert such leads of the component into preformed holes in a printed circuit board or panel, thereafter cutting the leads to a predetermined length upon one side of said panel and crimping the same to secure the component to the panel, for subsequent soldering of the leads to complete the desired electrical connection to the printed circuitry.

It is an object of the invention to provide a very compact and light weight hand tool having these functions, which tool is characterized by a pair of pivotally connected grip members, one of which is provided with a pair of fixed heads coacting in a novel manner with one another in the assembly of components to the printed circuit panel. One head is a lead forming head having relatively movable provisions actuated upon relative movement of the pivoted grips for the purpose of initially forming the component leads into position paralleling one another, the instrumentalities in question thereupon moving the component forwardly toward the other head for application of the component to a panel supported between said heads. Said other head is a lead cutting and crimping head, against which the printed circuit panel is disposed in position to receive in apertures of the panel the advancing formed leads on the forming head; and the cutting and crimping head had movable provisions for first severing the leads in a predetermined length at one side of the panel, then crimping the leads for subsequent soldering in the manner referred to above.

More specifically, it is an object of the invention to provide a tool of the character described, in which the lead forming head comprises a fixed guide longitudinally spaced from the cutting and crimping head, upon which guide a hollow forming housing is mounted to slide under actuation in response to relative pivotal movement of the grips of the tool. Such guide internally receives an anvil member, against which the body of the component is positioned, said anvil member being resiliently biased for movement relative to said housing; and a pair of component holding fingers are movably mounted upon the fixed guide for a controlled action in restraining the biased anvil member as the housing moves forwardly toward the lead forming and crimping head. It thus results that the lengths of the leads outwardly of the body are bent forwardly between the housing and anvil member as the former advances, causing the leads to be formed in parallel relation to one another facing the direction of advance of the housing; and upon disengagement of the holding fingers with the component the latter is bodily advanced by the housing and anvil into position in which the formed leads are inserted in the printed circuit panel.

Another object of the invention is to provide an improved portable tool as described, in which the fixed lead cut-off and crimping head, as mounted in longitudinally spaced relation to the guide of the fixed lead forming head, is provided with a movable lead cut-off and crimping blade engageable with the formed lead transversely of the length thereof to shorten and crimp the same in the manner referred to above. In accordance with the invention, this movable member is actuated for the transverse motion referred to by a cam-type actuator, which actuator is pivotally mounted upon an actuator extension of one of the relatively movable grips to actuate the lead forming housing in the manner described above. Such cam actuator engages the movable cut-off and crimping member of the head from beneath to produce the transverse lead severing and crimping action described.

The foregoing as well as other objects will become more apparent as this description proceeds, especially when considered in connection with the accompanying drawings illustrating the invention, wherein:

FIGS. 2 and 3 are, respectively, top plan and end elevational views of the tool, considering FIG. 3 as being viewed from the left of FIGS. 1 and 2, FIG. 3 being partially broken away;

Figures 1, 5:
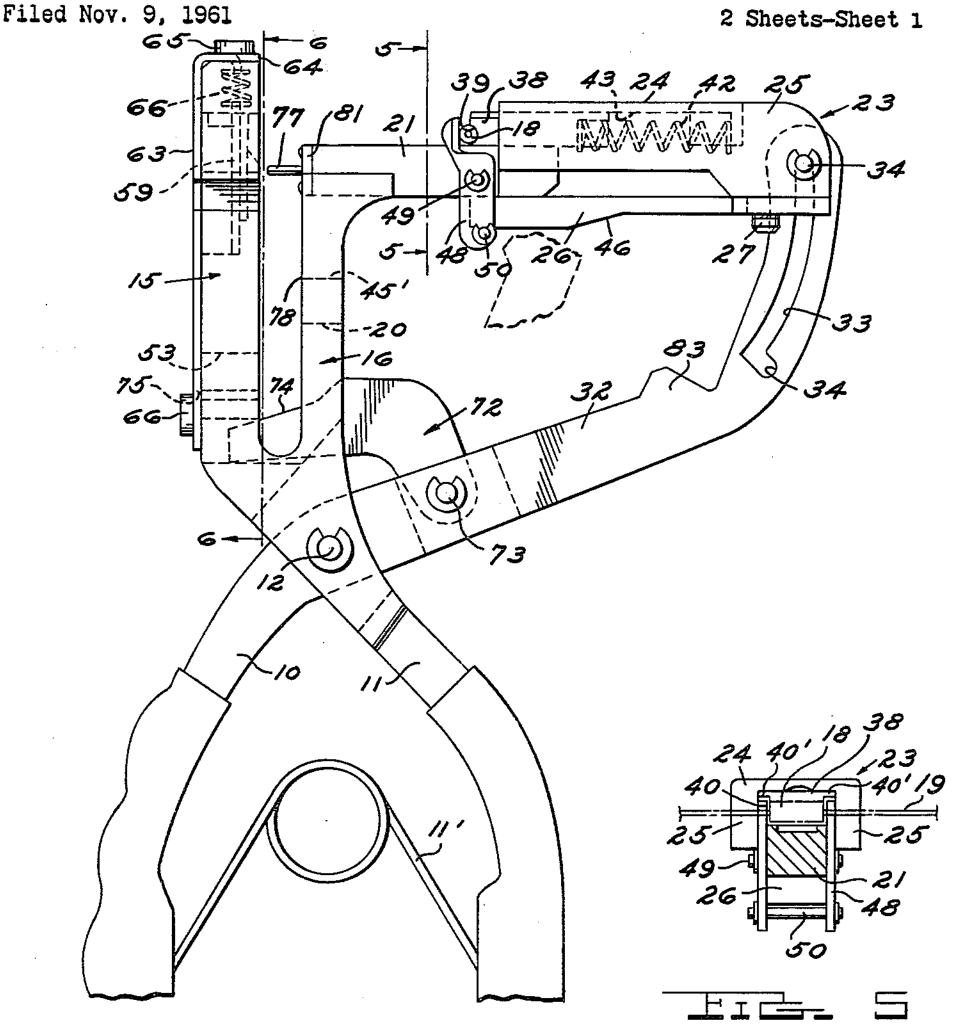
FIG. 1 is a view in side elevation of the improved tool.
FIG. 5 is a view in transverse vertical section along line 5—5 of FIG. 1.
Figures 4, 5, 6:
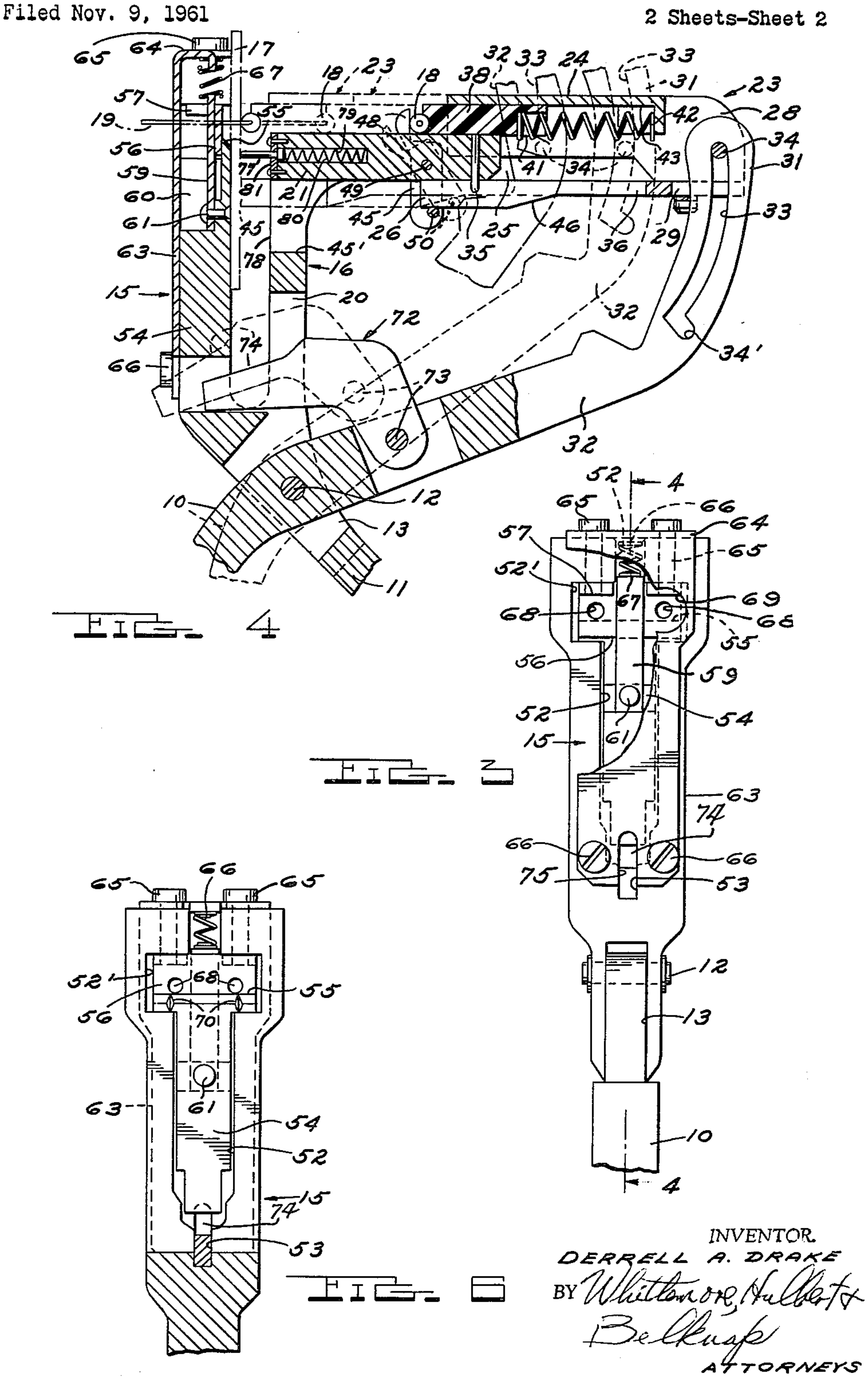
FIG. 4 is a fragmentary view in longitudinal vertical section through the tool along line 4—4 of FIGS. 2 and 3.
FIG. 6 is a view in transverse section along line 6—6 of FIG. 1, illustrating components of the lead cutting and crimping head of the tool.

The tool of the invention, as best shown in FIGS. 1 and 4, comprises a pair of hand grips 10, 11, which are pivotally connected to one another at 12, as by a pin, rivet or the like. To provide for this connection, the grip 11 has a vertical opening 13 formed therein between the sides thereof, in which the grip 10 is received. A spring 11' urges the grips apart.

Grip 11 proceeds forwardly and upwardly of the pivot 12 in the form of an integral extension providing a rugged, upright cut-off and crimping head, which is generally designated by the reference numeral 15, and will hereinafter be referred to in detail. Longitudinally to the rear of the head 15, i.e., in a direction at 90° to the axis of pivot member 12, an integral upright extension of the grip 11 provides a lead forming head, generally designated 16. A printed circuit panel, shown in dot-dash line in FIG. 4 and generally designated 17, is adapted to be inserted between heads 15 and 16 for the application thereto of the electrical component in questioin. For the present purpose, this may be considered to be a conventional axial lead type resistor 18 having aligned wire leads 19. Directly above the pivot member 12, the head 16 is formed to provide a vertical opening 20 longitudinally therethrough, such opening in fact being an upward continuation of the pivot accommodating opening 13. The purpose of this opening extension 20 is to accommodate an actuator cam involved in the lead cut-off and crimping action, as will be described.

The fixed lead forming head 16 has an integral, longitudinally and rearwardly projecting extension 21 which is, illustrated in FIG. 5, of generally rectangular transverse cross section. Extension 21 serves as a fixed guide and support for the sliding and pivotal actions of certain lead forming instrumentalities, to be described.

Figure 2:
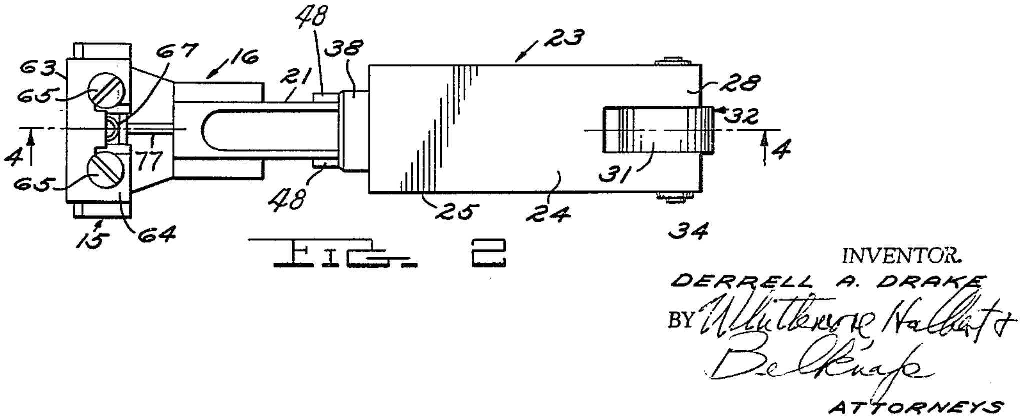

Such provisions are incorporated in a movable subassembly, generally designated 23, which is slidably mounted on the longitudinal rearward, integral guide portion 21 of forming head 16. The sub-assembly comprises a sliding housing 24 which is, as indicated in FIGS. 1, 2 and 5, of elongated nature and inverted U-shaped cross section, having depending side walls 25 of substantial thickness. A horizontal, elongated, plate-type control cam 26 is upwardly secured to housing 24 from beneath, adjacent the rear of the housing, as by a pair of transversely spaced screws 27 (FIG. 1); so that the control cam in effect constitutes a fixed part of housing 24, moving longitudinally on guide extension 21 with the housing in the operation of the tool.

As best illustrated in FIGS. 2 and 4, the rear of housing 24 is formed to provide a pair of integral, laterally spaced ears 28, and the rear of the control cam 26 is rearwardly slotted at 29 beneath this zone. This permits the reception of the upper end 31 of a rearwardly extending, integral arm portion 32 of the grip 10 of the tool. At its arcuate upper extremity 31, the arm 32, which serves as an actuator for the lead forming movable sub-asssembly 23, is provided with a mildly arcuate slot 33; and a pin 34 carried by the rear ears 28 of housing 24 is received in the slot 33. The slot has a rearwardly and downwardly offset portion at 34', for a purpose to be described.

Thus it is seen that when the grip 10 and its arm 32 move counterclockwise about pivot pin 12, moving the arm successively from its solid line position of FIG. 4 through its dotted line position to its dot-dash line position, the lead forming sub-assembly 23 will be correspondingly moved forwardly from its solid line position through its dotted line position to its dot-dash line position of the same figure, ultimately bringing the component 18 to the position shown at the left. For the purpose of assisting in guiding the longitudinal motion, the fixed head guide extension 21 carries an upright pin 35, as shown in FIG. 4, which projects downwardly into a narrow, upright and elongated guide slot 36 formed in the control cam 26 attached to housing 24.

An anvil member 38 of generally rectangular cross section, preferably formed of a suitable bearing type of material to minimize sliding friction, such as nylon, is slidably received in the housing 24 between the side walls 25 of the latter. As appears best in FIG. 1, this anvil member 38 is formed to provide an arcuate horizontal seat 39 across its width; and the sides of the member to the rear of this seat are laterally inwardly relieved to provide accommodation seats 40 for a predetermined distance rearwardly of the seat, for a purpose to be described. Referring to FIG. 4, the rear of anvil member 38 is provided with a central recess 41 receiving the forward end of a coil compression spring 42, the rear of this spring being received in an aligned recess 43 of housing 24. Thus spring 42 biases anvil member 38 forwardly, or to the left as viewed in FIGS. 1 and 4.

As appears in FIG. 4, the control cam 26 is provided with a central forward bumper pad 45 of resilient material. Cam 26 passes forwardly through an opening 45' in the head 16 beneath its rear extension 21 so that as fully projected to the left (FIG. 4) the pad may have cushioning engagement against the adjacent surface of panel 17. Cam 26 is also formed to provide a mildly rearwardly and upwardly inclined cam formation 46, for a purpose to be described.

In a predetermined position thereon, shown as forwardly of its guide pin, the guide extension 21 provides a mount for a pair of laterally spaced holding fingers 48, which are pivotally mounted on extension 21 by means of a pin 49 extending horizontally through the latter. As illustrated in FIG. 5, the width of the extension is sufficiently small to permit the mounting of a holding finger 48 on each side thereof and still permit the housing wall 25 to slide past the fingers in the action of the tool. Similarly, the elongated anvil side recesses 40 accommodate motion of the upper ends of fingers 28 in the pivotal action thereof.

It is the function of the fingers 48 to hold the axial lead component 18 against the forward seat 39 of anvil member or block 38 as the housing 24 of forming sub-assembly 23 moves forwardly, or from the right to the left of FIGS. 1 and 4, the anvil member 38 remaining relatively fixed as this occurs, so that the advancing side walls 25 of the housing can engage the projecting leads 19 of the component, bending the same 90° forwardly on the fingers to position shown in dotted and dot-dash line in FIG. 4.

To this end, the fingers 48 are provided at their lower ends with a fixed guide pin 50 to follow the lower surface of control cam 26, in the manner of a cam follower. Thus, in the solid line position of the parts shown in FIGS. 1 and 4, the pin 50, in engaging and riding the flat horizontal surface of control cam 26 as the latter moves forwardly, will hold upper ends of the fingers 48 in the position shown, engaging the component 18 and holding it against the arcuate seat 39 of anvil block 38. However, upon an advance of the housing 24 and cam 26 to a sufficient extent, or to the dotted line position of the parts in FIG. 4, the follower pin 50 will pass onto the inclined cam formation 46, enabling fingers 48 to fall away counterclockwise about their pivot 49.

The advancing housing walls 25 thus bend the leads 19 ninety degrees in the manner referred to above; and with the printed circuit panel 17 properly positioned against the inner surface of the fixed cutting and crimping head 15, the leads 19 will be guided into apertures in the panel, with the parts in the final dot-dash line position of FIG. 4, the end of anvil block 38 being projected forwardly relative to the housing 24 by its spring 42. Block 38 is restrained in this position against the action of spring 42 by the engagement of lateral rear shoulders 40', above the finger accommodating recesses 40 (see FIG. 5), with inward shoulders on the housing walls 25 at the forward end of the latter. As so positioned, the movable provisions of the head 15 come into play to complete the assembly of the component 18 to the panel 17.

Reference should be made to FIGS. 3, 4 and 6 for details of construction of the fixed cutting and crimping head 15. It is seen that the head 15 has a vertically elongated slot 52 extending centrally upwardly through the top thereof (FIG. 6), which slot at its bottom has a portion 53 of restricted width in forward alignment with the upper extension portion 20 of the opening 13 of grip 11 which has been referred to. Slot 52 is also widened in a rectangular portion 52' located beneath the top of head 15.

The slot 52 slidably receives a moving blade member 54 associated with the cut-off and crimping head 15; and the member 54 is formed in T-shape to provide an integral widened blade 55 at its top which is received in the upper widened portion 52' of slot 52. The same slot portion also receives with slight clearance a rectangular guide piece 56 having a pair of integral, laterally spaced ears 57 at its top which face into the widened head slot portion 52'. Ears 57 serve the purpose of securing guide piece 56 fixedly in place on head 15 in a manner to be described.

An upright guide finger 59 is secured to blade member 54 in a forward or outer recess 60 of the latter, as by means of a rivet 61; and finger 59 extends upwardly of guide piece 56 on the side of the latter opposite the integral top blade 55 of said member, the finger passing between the ears 57 of the latter. Thus finger 59 acts in effect as an upward guide extension of blade member 54, such extension and the blade portion 55 upwardly straddling the fixed guide piece 56; and thus producing a controlled stroke of blade 54 in the widened slot portion 52' of head 15.

The outer area and top of cut-off and crimping head 15 are covered, and the forward recess 60 of blade member 54 closed, by a vertically elongated closure plate 63 having an integral, rearwardly extending top cross flange 64. The plate 63 is, as illustrated in FIGS. 1 and 3, secured by screws 65, 66 to the upper and lower respective parts of the fixed head 16 of the tool, on either side of the vertical slot 52 of the head. Screws 65 take downwardly, through flange 64 and the shoulders of head 15 adjoining slot 52 at either side of the slot enlargement 52', into threaded engagement with the ears 57 of the guide piece 56. Thus the latter is held in place and constituted a fixed part of cut-off and crimping head 15.

A small coil compression spring 67 acts, as centered between a downward tang on the center of flange 64 and the top of guide finger 59 (see FIGS. 2, 3 and 4) to urge the blade member 54 downwardly in slot 52.

The fixed head guide piece 56 has a pair of laterally spaced apertures 68 receiving the leads 19, as urged by the anvil block 38 prior to cut off, and the closure stamping 63 has apertures 69 (FIG. 3) in alignment with them through which the leads may project prior to severance. As shown in FIG. 6, the blade 55 is formed to provide a pair of small lead crimping or ironing grooves or notches 70, by which the leads are engaged and ironed upwardly after severance, into position to be soldered in place.

The reference numeral 72 generally designates a blade actuator cam; this member is pivotally mounted by a pin, as at 73, upon the actuator arm 32, so as to be operated, upon counterclockwise motion of the arm about pivot 12, from the solid line position of FIG. 4 to the dot-dash position thereof in FIG. 4. In making this motion, an inclined forward nose portion 74 of the actuator cam 72, as received in the head slot portion 53, slidingly engages from beneath the bottom of the vertically moving blade member 54 of the cut-off and crimping head 15. Closure stamping 63 is recessed at 75 (FIG. 3) to accommodate the cam. The resulting motion of the parts is indicated in solid and dot-dash line in FIG. 4, it being seen that the blade member 54 is elevated for cut-off, then crimping engagement of its integral blade 55 with the leads 19 on the adjacent side of the printed circuit panel 17.

In operation, with an axial lead component 18 positioned forwardly of anvil block 38 and held in that position by the pivoted fingers 48, the user grasps the hand grips 10, 11 in one hand, holding the circuit panel 17 in the other hand before the crimping head 15, and compresses the grips. The forming housing 24 moves forwardly past the relatively stationary anvil 38 and component 18, as the latter is restrained by fingers 48, and the advancing side walls 25 of the housing bend the leads 19 forwardly about the fingers 48. As this occurs, the fingers are held in place by the restraining engagement of the horizontal bottom of the advancing control cam 26 with the guide pin 50 on the fingers, forwardly of the cam formation 46.

Having held the component 18 in place until housing 24 telescopes fully forwardly over the anvil 38 to bend the leads 19 as described, the follower guide pin 50 of the fingers now finds itself beneath the inclined cam formation 46, enabling fingers 48 to pivot counterclockwise (FIG. 4) about their pivot at 49 to the inoperative position shown in dotted line in FIG. 4. In passing from the solid line through the dotted line to the dot-dash line position of FIG. 4, the housing 24 carries the component 18 against the surface of the printed circuit panel 17, its lead 19 having passed through the intended apertures in the latter, and ready to be cut off and formed against the rear of that panel.

As indicated in FIG. 4, after the grips 10, 11 have been operated to swing actuator arm 32 from the solid line position thereof through the dotted line position to bring arm 32 to the dot-dash position, the electrical component 18 will be positioned adjacent the panel 17, with the leads 19 formed as described and inserted into spaced apertures of the panel. At this point the motion of arm 32 counterclockwise on the pivot 12 brings the actuator cam 72 to the position illustrated in dot-dash line in FIG. 4, and blade member 54 is elevated to cut off the leads 19 to desired length, whereupon the leads will be engaged by the crimping formations 70 of blade 55 just below the shearing edge of the latter, with the result that the severed leads are ironed upwardly onto the rear of panel 17, and ready to be soldered in place.

The pin 34 connecting the lead forming housing 24 to the actuator arm 32, in the arcuate slot 34 of the latter, passes into the bottom rear recessed portion 34 of the slot as the cut-off and crimping operations occur. This enables them to take place without exerting undue pressure on the component 18.

If desired, for the purpose of facilitating the positioning the printed circuit panel for the lead forming cut-off and crimping actions described, the fixed mounting member 16 for the forming device 23 may be provided with a yieldably sustained locating or registering pin 77 (FIG. 4) projecting from its forward face 78 and adapted to engage releasably in a small aperture or dimple in the facing surface of panel 17 as the latter is slid vertically or horizontally past the pin 77. With such aperture being accurately located relative to the lead receiving holes of the panel to correspond to the spacing of the pin from the anvil seat 39, the panel will be readily located and sustained in proper position under light force while the forming, cutting and crimping operations take place.

To this end, the pin may be retained in place in a recess 79 (FIG. 4) on member 16, in which it is biased forwardly by a spring 80, the pin being held in place by a small holding plate 81 screwed onto member 16. Other equivalent and appropriate panel registering means will no doubt suggest themselves to those skilled in the art.

In order to insure that the component holding fingers 48 will, when the follower 50 thereof has passed off cam formation 46 upon full forward motion of the forming sub-assembly 23, be positioned properly to clear cam 26 upon its return stroke to the rear, the actuator arm 32 is provided with an integral finger restoring projection 83. This will move from the solid to the dotted line position of FIG. 1 when arm 32 swings counterclockwise, engaging the fingers 48 to swing the latter clockwise about their pivot 49 into position to clear the returning cam formation 46.

The invention affords an improved special tool for the automatic forming, cut-off and crimping of the axial leads of an electrical component, which tool is compact and light in weight for easy handling. It permits an expedited and facilitated procedure for applying such components to a printed circuit panel, as compared with tedious bending, cutting and crimping operations performed by hand, or using fixed equipment rather than equipment of a portable type. It is contemplated that tools may be provided having varying relative arrangements of anvil, holding fingers, cut-off and crimping blade, and the like, to handle the assembly of components to more or less standardized printed circuit panels which receive components of different type or size, although themselves also standardized in their respective classifications.

What I claim as my invention is:

1. A portable tool to form and crimp a lead of an electrical component, comprising a pair of members having means operatively connecting the same for relative movement, one of said members mounting in spaced relation to one another a lead forming device and a lead cut-off and crimping device, the other of said members having an actuator to operate said devices upon relative movement of the members, said lead forming device comprising means on said one of said members operatively connected to the latter and automatically operated by one part of said actuator in response to relative movement of said members to bend a lead relative to said component and position the component and bent lead with the latter extending through a mounting panel between said devices, said lead cut-off and crimping device comprising a blade member mounted on and movable relative to said one member in response to engagement by another part of said actuator, upon said relative movement of the members, to cut off and crimp the lead formed by said first named device on the side of said panel opposite the remainder of the component.

2. A portable tool to form and crimp a lead of an electrical component, comprising a pair of members having means pivotally connecting the same for relative movement, one of said members mounting in spaced relation to one another a lead forming device and a lead cut-off and crimping device, the other of said members having an actuator to operate said devices upon relative pivoting of the members, said lead forming device comprising coacting elements on said one of said members operatively connected to the latter and to one another and automatically operated by one part of said actuator in response to relative pivotal movement of said members to bend a lead relative to said component and position the component and bent lead with the latter extending through a mounting panel between said devices, said lead cut-off and crimping device comprising a blade member mounted on and movable relative to said one member in response to engagement by another part of said actuator, upon said relative movement of the members, to cut off and crimp the lead formed by said first named device on the side of said panel opposite the remainder of the component.

3. A portable tool to form and crimp a lead of an electrical component, comprising a pair of members having means pivotally connecting the same for relative movement, one of said members mounting in spaced relation to one another a lead forming device and a lead cut-off and crimping device, the other of said members having an actuator to operate said devices upon relative pivoting of the members, said lead forming device comprising coacting elements on said one of said members operatively connected to the latter and to one another and automatically operated by one part of said actuator in response to relative pivotal movement of said members to bend a lead relative to said component and position the component and bent lead with the latter extending through a mounting panel between said devices, said lead cut-off and crimping device comprising a blade member mounted on and movable relative to said one member in response to engagement by another part of said actuator, upon said relative movement of the members, to cut off and crimp the lead formed by said first named device on the side of said panel opposite the remainder of the component, said last named part including a cam operatively engaging said blade member and operatively connected to said actuator for operation by the latter.

4. A portable tool for forming the leads of an electrical component for application of the same to a wiring or like panel, comprising a relatively fixed grip providing, in fixed, longitudinally spaced relation to one another, a lead crimping head and a lead forming head coacting with said crimping head in the application of a component and its formed lead to said panel, said forming head having a guide portion projecting longitudinally therefrom in the direction away from said crimping head, a relatively movable grip pivotally connected to said first named grip at a point spaced transversely of said heads, a lead forming device mounted on said guide portion of said forming head, said device having an operating connection to said relatively movable grip for actuation by the latter, said lead forming device being slidable longitudinally forwardly on said guide portion, an anvil member rearwardly sustaining said component relative to said lead forming device with at least one lead of said component projecting transversely of the direction of movement of said lead forming device on said forming head, and means to releasably engage said lead laterally outwardly of said anvil member during at least a portion of the longitudinal forward movement of said lead forming device relative to the guide portion and anvil member, thus to coact with the lead forming device and anvil member in the forming of said lead, said lead forming device moving the component and its formed lead toward said crimping head and a panel interposed between said forming and crimping heads.

5. A portable tool for forming the leads of an electrical component for application of the same to a wiring or like panel, comprising a relatively fixed grip providing, in fixed, longitudinally spaced relation to one another, a lead crimping head and a lead forming head coacting with said crimping head in the application of a component and its formed lead to said panel, said forming head having a guide portion projecting longitudinally therefrom in the direction away from said crimping head, a relatively movable grip pivotally connected to said first named grip at a point spaced transversely of said heads, a lead forming device mounted for longitudinal sliding movement on said guide portion of said forming head, said device having an operating connection to said relatively movable grip for sliding actuation by the latter, said lead forming device comprising a housing slidable longitudinally forwardly on said guide portion, an anvil member movable longitudinally relative to said housing and rearwardly sustaining said component relative to said housing with at least one lead of said component projecting transversely of the direction of movement of said lead forming device on said forming head, and means to releasably engage said lead laterally outwardly of said anvil member during at least a portion of the longitudinal forward movement of said housing relative to the anvil member, thus to coact with the housing and anvil member in the forming of said lead, said lead forming device moving the component and its formed lead toward said crimping head and a panel interposed between said forming and crimping heads.

6. A portable tool for forming the leads of an electrical component for application of the same to a wiring or like panel, comprising a relatively fixed grip providing, in fixed, longitudinally spaced relation to one another, a lead crimping head and a lead forming head coacting with said crimping head in the application of a component and its formed lead to said panel, said forming head having a guide portion projecting longitudinally therefrom in the direction away from said crimping head, a relatively movable grip pivotally connected to said first named grip at a point spaced transversely of said heads, a lead forming device mounted for longitudinal sliding movement on said guide portion of said forming head, said device having an operating connection to said relatively movable grip for sliding actuation by the latter, said lead forming device comprising a housing slidable longitudinally forwardly on said guide portion, an anvil member within and movable longitudinally relative to said housing, and resiliently biased for such movement in the direction toward said cutting and crimping head, said anvil member rearwardly sustaining said component relative to said housing with at least one lead of said component projecting transversely of the direction of movement of said lead forming device on said forming head, and means to releasably engage said lead laterally outwardly of said anvil member during at least a portion of the longitudinal forward movement of said housing relative to the anvil member, thus to coact with the housing and anvil member in the forming of said lead, said lead forming device moving the component and its formed lead toward said crimping head and a panel interposed between said forming and crimping heads.

7. A portable tool for forming the leads of an electrical component for application of the same to a wiring or like panel, comprising a relatively fixed grip providing, in fixed, longitudinally spaced relation to one another, a lead crimping head and a lead forming head coacting with said crimping head in the application of a component and its formed lead to said panel, said forming head having a guide portion projecting longitudinally therefrom in the direction away from said crimping head, a relatively movable grip pivotally connected to said first named grip at a point spaced transversely of said heads, a lead forming device mounted for longitudinal sliding movement on said guide portion of said forming head, said device having an operating connection to said relatively movable grip for sliding actuation by the latter, said lead forming device comprising a housing slidable longitudinally forwardly on said guide portion, an anvil member within and movable longitudinally relative to said housing, and resiliently biased for such movement in the direction toward said cutting and crimping head, said anvil member rearwardly sustaining said component relative to said housing with at least one lead of said component projecting transversely of the direction of movement of said lead forming device on said forming head, and means movably mounted on said forming head to releasably engage said lead laterally outwardly of said anvil member during at least a portion of the longitudinal forward movement of said housing relative to the anvil member, thus to coact with the housing and anvil member in the forming of said lead, said lead forming device moving the component and its formed lead toward said crimping head and a panel interposed between said forming and crimping heads.

8. A portable tool for forming the leads of an electrical component for application of the same to a wiring or like panel, comprising a relatively fixed grip providing, in fixed, longitudinally spaced relation to one another, a lead crimping head and a lead forming head coacting with said crimping head in the application of a component and its formed lead to said panel, said forming head having a guide portion projecting longitudinally therefrom in the direction away from said crimping head, a relatively movable grip pivotally connected to said first named grip at a point spaced transversely of said heads, a lead forming device mounted on said guide portion of said forming head, said device having an operating connection to said relatively movable grip for actuation by the latter, said lead forming device being slidable longitudinally forwardly on said guide portion, an anvil member rearwardly sustaining said component relative to said lead forming device with at least one lead of said component projecting transversely of the direction of movement of said lead forming device on said forming head, and means to releasably engage said lead laterally outwardly of said anvil member during at least a portion of the longitudinal forward movement of said lead forming device relative to the guide portion and anvil member, thus to coact with the lead forming device and anvil member in the forming of said lead, said lead forming device moving the component and its formed lead toward said crimping head and inserting said formed lead through a panel interposed between said forming and crimping heads, said crimping head comprising a member movably mounted on said relatively fixed grip and operatively connected to said relatively movable grip for a stroke transversely of the direction of movement of said lead forming device, following the forming of a lead by the latter, thus to engage and crimp the formed lead in locked relation to said interposed panel on the side of said panel opposite the remainder of the component.

9. A portable tool for forming the leads of an electrical component for application of the same to a wiring or like panel, comprising a relatively fixed grip providing, in fixed, longitudinally spaced relation to one another, a lead crimping head and a lead forming head coacting with said crimping head in the application of a component and its formed lead to said panel, said forming head having a guide portion projecting longitudinally therefrom in the direction away from said crimping head, a relatively movable grip pivotally connected to said first named grip at a point spaced transversely of said heads, a lead forming device mounted for longitudinal sliding movement on said guide portion of said forming head, said device having an operating connection to said relatively movable grip for sliding actuation by the latter, said lead forming device comprising a housing slidable longitudinally forwardly on said guide portion, an anvil member within and movable longitudinally relative to said housing, and resiliently biased for such movement in the direction toward said cutting and crimping head, said anvil member rearwardly sustaining said component relative to said housing with at least one lead of said component projecting transversely of the direction of movement of said lead forming device on said forming head, and means to releasably engage said lead laterally outwardly of said anvil member during at least a portion of the longitudinal forward movement of said housing relative to the anvil member, thus to coact with the housing and anvil member in the forming of said lead, said lead forming device moving the component and its formed lead toward said crimping head and inserting said formed lead through a panel interposed between said forming and crimping heads, said crimping head comprising a member movably mounted on said relatively fixed grip and operatively connected to said relatively movable grip for a stroke transversely of the direction of movement of said lead forming device, following the forming of a lead by the latter, thus to engage and crimp the formed lead in locked relation to said interposed panel on the side of said panel opposite the remainder of the component.

10. A portable tool for forming the leads of an electrical component for application of the same to a wiring or like panel, comprising a relatively fixed grip providing, in fixed, longitudinally spaced relation to one another, a lead crimping head and a lead forming head coacting with said crimping head in the application of a component and its formed lead to said panel, said forming head having a guide portion projecting longitudinally therefrom in the direction away from said crimping head, a relatively movable grip pivotally connected to said first named grip at a point spaced transversely of said heads, a lead forming device mounted for longitudinal sliding movement on said guide portion of said forming head, said device having an operating connection to said relatively movable grip for sliding actuation by the latter, said lead forming device comprising a housing and slidable longitudinally forwardly on said guide portion, an anvil member within and movable longitudinally relative to said housing, and resiliently biased for such movement in the direction toward said cutting and crimping head, said anvil member rearwardly sustaining said component relative to said housing with at least one lead of said component projecting transversely of the direction of movement of said lead forming device on said forming head, and means movably mounted on said forming head to releasably engage said lead laterally outwardly of said anvil member during at least a portion of least a portion of the longitudinal forward movement of said housing relative to the anvil member, thus to coact with the housing and anvil member in the forming of said lead, said lead forming device moving the component and its formed lead toward said crimping head and inserting said formed lead through a panel interposed between said forming and crimping heads, said crimping head comprising a member movably mounted on said relatively fixed grip and operatively connected to said relatively movable grip for a stroke transversely of the direction of movement of said lead forming device, following the forming of a lead by the latter, thus to engage and crimp the formed lead in locked relation to said interposed panel on the side of said panel opposite the remainder of the component.

11. A portable tool for assembling an axial lead type electrical component to a panel by inserting the lead in an aperture of the panel, comprising first means for supporting the component with the lead thereof extending axially and having a member movable relative to said supporting means to bend the lead upon said relative movement to a position for assembly on said panel, second means to rearwardly sustain said panel in a position for the forward insertion of the lead in the panel aperture upon said movement of said member, third means including a member operatively connected to said first named member and movable in response to said movement of the latter attending the insertion of the lead to engage and operate upon the inserted lead at the rear of the panel, and hand grip members for the manual support of the tool, said grip members being operatively connected to said first, second and third means to operate said members in the manner described.

References Cited in the file of this patent

UNITED STATES PATENTS 2,808,587 Hancock ---------------- Oct. 8, 1957